H. C. KING.
VEHICLE LIFTER AND SUPPORT.
APPLICATION FILED OCT. 4, 1916.
1,247,967.
Patented Nov. 27, 1917.
2 SHEETS—SHEET 1.
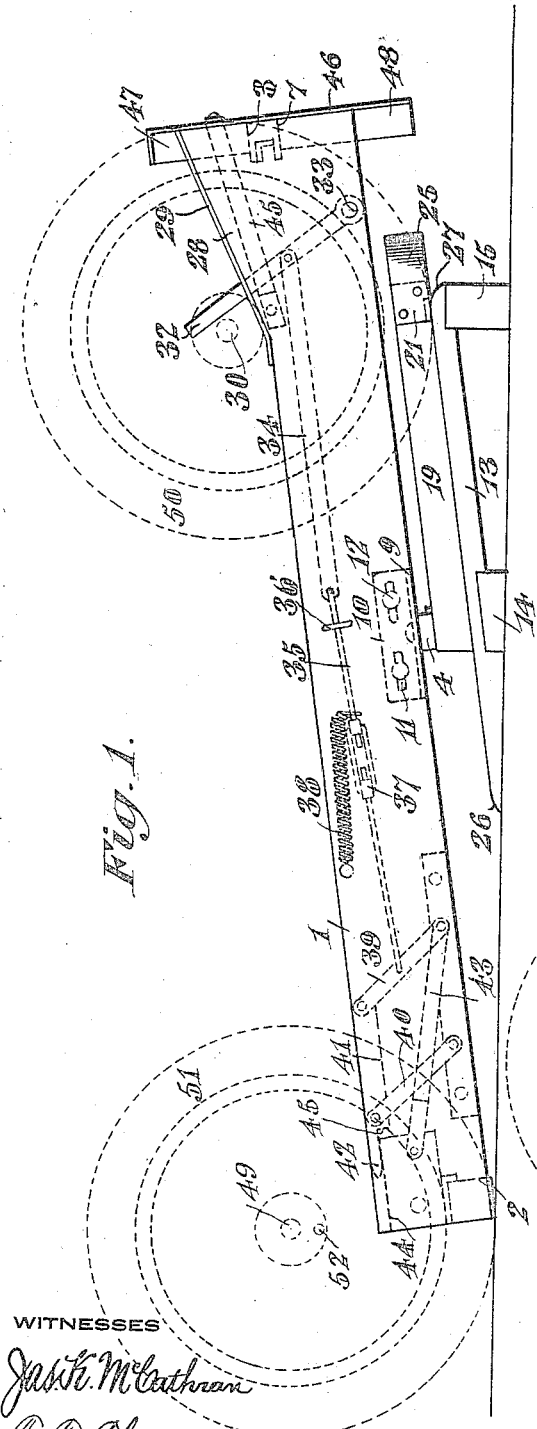
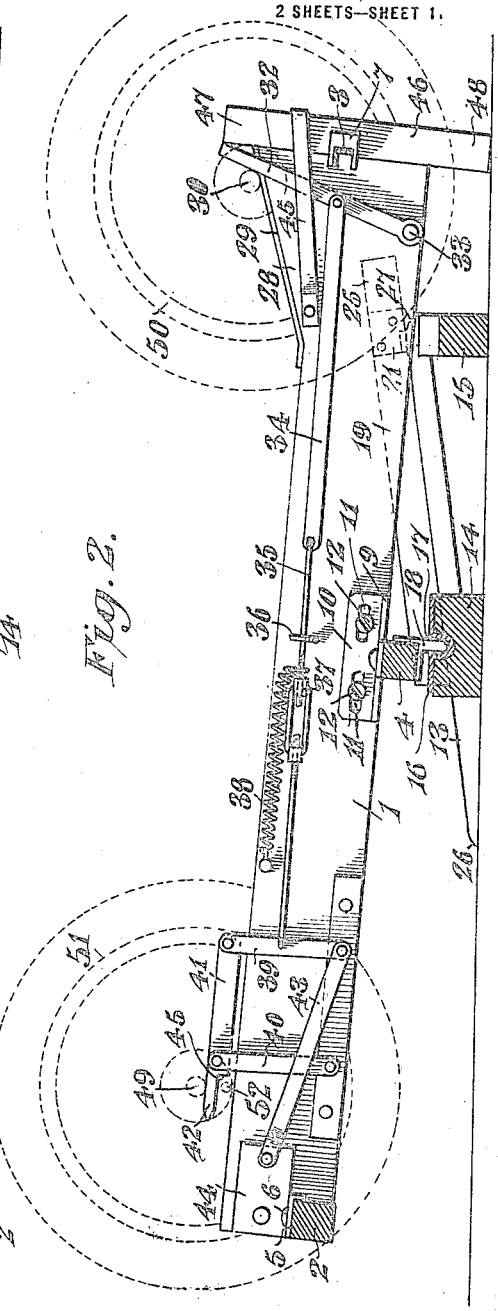
WITNESSES
INVENTOR
Henry C. King.
BY
ATTORNEY

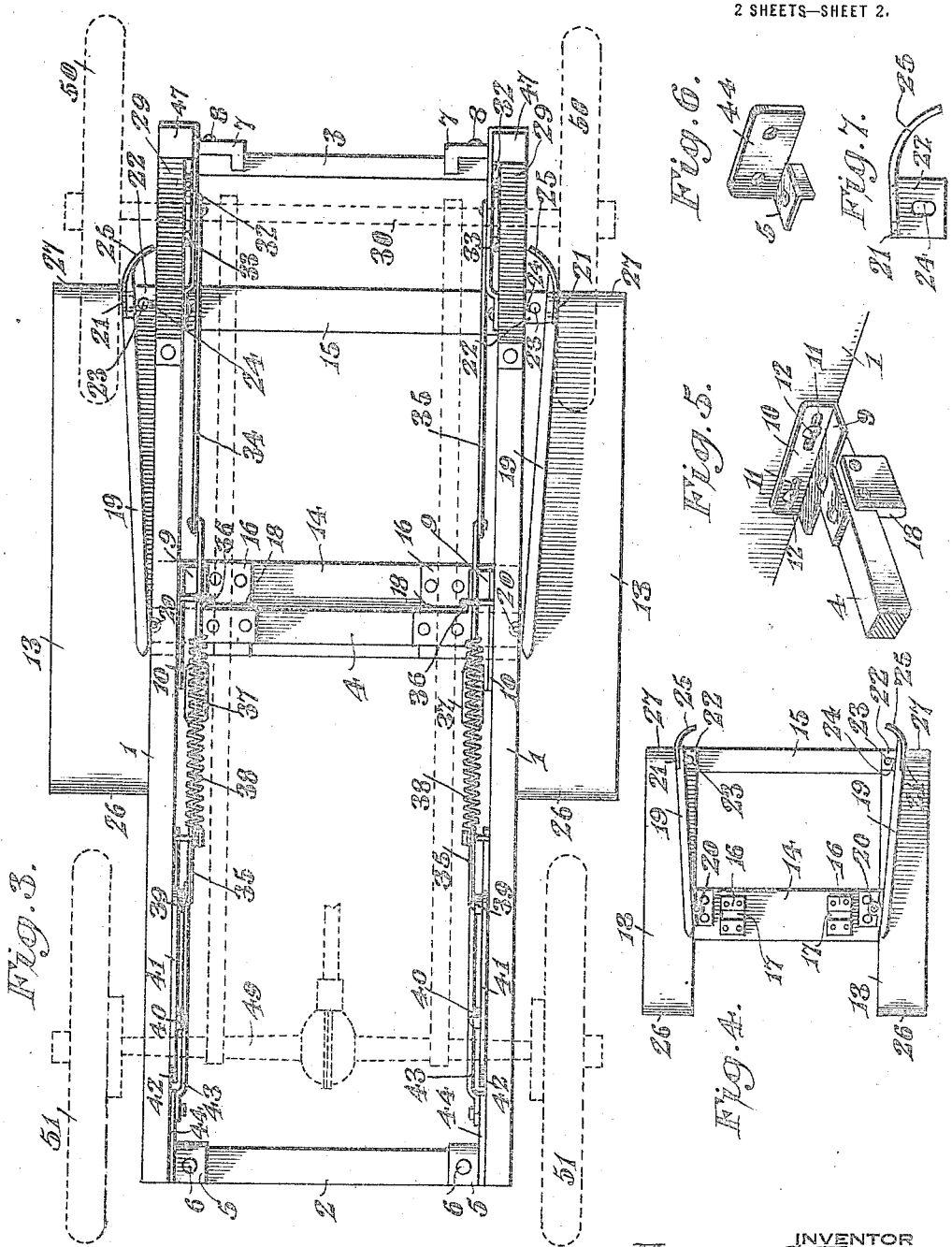

UNITED STATES PATENT OFFICE.

HENRY C. KING, OF WASHINGTON, KANSAS.

VEHICLE LIFTER AND SUPPORT.

1,247,967.

Specification of Letters Patent.

Patented Nov. 27, 1917.

Application filed October 4, 1916. Serial No. 123,736.

*To all whom it may concern:*

Be it known that I, HENRY C. KING, a citizen of the United States, residing at Washington, in the county of Washington and State of Kansas, have invented a new and useful Vehicle Lifter and Support, of which the following is a specification.

This invention has reference to vehicle lifters and supports, and is especially intended for use in connection with automobiles, without, however, limitation to such special type of vehicle.

The object of the invention is to provide a support which will automatically tilt the vehicle in a direction to facilitate draining the radiator in case the vehicle is an automobile, and to provide for the adjustment of the support to automobiles of various sizes and weight distribution.

In accordance with the present invention there is a rocker frame mounted on an inclined support having wheeled tracks so constructed that after the automobile engages the tracks it will be automatically guided into proper relation with the rocker frame. There is also provided means on the rocker frame to support the rear wheels of the vehicle without interference with truss rods employed on many types of automobiles, and such means are so constructed as to be moved into and out of operative position so as to offer no interference with the movement of the automobile upon the supporting structure. The frame is so mounted that when the vehicle reaches the end of the frame the latter is overbalanced and the vehicle tips with the front wheels low and the rear wheels elevated, whereby the radiator is so positioned that it may be fully drained and thus insuring against damage in cold weather.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of a vehicle lifter with an automobile indicated in dotted lines and with the support in the initial position and before the automobile is fully thereon.

Fig. 2 is a longitudinal section of the structure of Fig. 1 showing the tilting frame in the position it assumes when the automobile is fully thereon.

Fig. 3 is a plan view of the structure.

Fig. 4 is a plan view of the carrier for the tiltable frame, but shown on a smaller scale than the other figures.

Fig. 5 is a perspective view of an adjustable bracket and adjacent parts, whereby the axis of rocking may be shifted lengthwise of the tiltable frame.

Figs. 6 and 7 are detail perspective views.

Referring to the drawings there is shown a tiltable frame comprising sides 1 of suitable length, width and thickness connected at the ends by cross bars 2 and 3 and an intermediate cross bar 4. These parts may be secured together in any suitable manner, and in the drawings the end bar 2 is shown as made fast to the side pieces 1 by a bracket structure 5 shown separately in Fig. 6. The bar 2 is secured to the bracket 5 by bolts 6 or other suitable fastening means, whereby the bar may be disconnected from the side pieces 1 at will.

The bar 3 is held to the side pieces by brackets 7 and is connected to the brackets by bolts 8 or other suitable fastening means so arranged that the bar 3 may be disconnected if desired.

The bar 4 which is arranged about midway of the length of the frame is secured to the side pieces by brackets 9 each having a flange 10 with elongated slots 11 therein traversed by bolts 12 or other fastening devices. By this means the bar 4 may be adjusted lengthwise of the sides 1.

The tiltable frame is mounted upon a support consisting of tracks 13 connected by cross bars 14, 15, respectively, and the supporting frame is of a suitable length for a purpose which will hereinafter appear. The bar 14 carries socket members 16 with elongated sockets 17 arranged lengthwise of the bar, this being transversely of the supporting frame. Adapted to seat in the sockets 17 are pivot blocks 18 fast to the bar 4 in depending relation thereto. The pivot blocks 18 are elongated like the sockets 17 and arranged to rock therein so that the tiltable frame may be correspondingly rocked.

The cross bars 14 and 15 are so arranged that when resting on a level surface the tracks 13 are in slanting relation thereto, one end of each track being substantially coincident with such level surface, while the other end carried by the bar 15 is considerably elevated. On each track 13 there is mounted a guide strip 19 having an upright hinge or pivot 20 at one end coincident with the bar 14, while at the other end about in line with the bar 15 the strip 19 carries an angle plate 21 having an angle flange 22 resting on the track 13 and held thereto by a screw or bolt 23, extending through an elongated slot 24 in the angle flange 22. The plate 21 is formed with a curved extension 25 for a purpose which will presently appear. By adjusting the plate 21 the strips 19, which are set on edge, may be arranged at a greater or less angle to the tracks 13, so that the ends carrying the plates 21 may have a greater spread than the pivoted ends of the guide strips, this being for a purpose which will presently appear. The opposite ends of the tracks 13 are rounded downwardly with relation to the surface upon which the supporting frame is mounted, these rounded ends being indicated at 26 and 27, respectively.

That end of the tiltable frame having the bar 2 may be considered as the entering end and the rocker blocks 18 are so positioned that under normal conditions when the frame is not in use the end provided with the bar 2 overbalances the other end and consequently is normally in engagement with the surface upon which the device is supported.

The other or front ends of the sides 1 are gradually thickened by having the upper edge widened in the direction of the height of the sides, this widened portion being indicated at 28 and is protected by a guard strip 29 designed to support the front axle of the automobile, which axle is indicated in dotted lines at 30. Carried by each side member 1 near the front end thereof, which is the end shown at the right hand in Figs. 1 and 2, there is mounted a lever 32 having a pivot connection 33 with the corresponding side member 1 near the bottom edge thereof. Connected to the lever 32 is one end of a link 34, the other end of which is connected to one end of a rod 35 carried through a guide 36 on the inner face of the corresponding side member 1 and including a turnbuckle 37 by means of which the effective length of the rod 35 may be changed. Fast at one end to an appropriate point of the rod 35 is a spring 38 having its other end secured to the side member 1. Near what may be termed the rear end of each side member 1 there is mounted at one end a lever 39 and in parallel relation to the lever 39 is another lever 40. Those ends of the two levers 39 and 40 remote from their pivot supports are connected by a link 41 so that the two levers 39 and 40 and link 41 provide a parallel motion structure. The link 41 is continued beyond the lever 40 to provide an elongated nose 42, which in the particular showing of the drawings is narrower than the link 41. The two levers 39 and 40 are braced and guided by a strip 43 made fast to fixed parts of a respective side member. One end of the guide strip 43 is made fast to a block 44 serving as a stop for the link 41 and levers 39 and 40, the nose 42 providing a shoulder 45 where merging into the link 41, and this shoulder abuts the block 44 when the parts are in the retracted position under the action of the spring 38. Each lever 32 is braced by a guide strip 45.

At the wide or front end of each side 1 is an upright 46 projecting above the wide end of the side bar to form a stop 47 and projecting below the side bar to form a leg 48.

The rear axle of the automobile is indicated in dotted lines at 49, while the front and rear wheels are indicated at 50 and 51, respectively. The dotted line indication of the automobile is sufficient to indicate such a vehicle without any attempt at the details of the vehicle.

Considering the tiltable frame as sufficiently narrow to be straddled by the wheels of the vehicle with the tracks 13 outside of the sides of the frame and the frame in the tilted position shown in Fig. 1, that is, with the rear or entering end low and the front end high, an automobile may be run upon the tracks 13 and as soon as the guides 19 engage the inner faces of the wheel the operator may release the steering wheel because these guides will properly center the vehicle with respect to the tiltable frame.

As the vehicle travels up the inclined tracks 13 and along the frame 1, the inclination of the tracks which corresponds to the inclination of the sides 1 is sufficient to hold the front axle 30 above the top edges of the sides 1. Ultimately the front axle 30 engages with the levers 32, thus rocking these levers and pulling the links 34 and rods 35 lengthwise against the action of the springs 38. The result is that the parallel-motion lever-structure made up of the levers 39 and 40 and the links 41 are moved from their lowered retracted position into a raised active position shown in Fig. 2. This carries each nose 42 to a height above the top edge of the corresponding side 1. The parts are so proportioned and timed in movement that the forward movement of the vehicle carries the rear axle 49 above the nose 42 and the height of the latter is at the time such that the rear truss rod of the vehicle indicated at 52 moves between the nose 42 and the top edge of the corresponding side 1. While this is happening the vehicle is moving toward the front of the tiltable frame until movement is finally arrested by the engagement of the levers 32 with the stop ends 47 of the uprights or posts 46. As this happens the front wheels run off the upper ends of the tracks 13 which are appropriately rounded to prevent any injury to the tires, and the weight of the vehicle is then sufficient to overbalance the rear end of the tiltable frame and the part of the vehicle carried thereby, so that the front end drops until the legs 48 rest upon the surface carrying the structure. The proper tilting may be assured by a suitable adjustment of the bar 4 with relation to the sides 1, whereby the weight of the front end of the vehicle will be sufficient to overbalance the tiltable frame and the rear end of the vehicle then carried by the noses 42 underriding and engaging the rear axle 49. At this time the truss rod 52 being lodged between the two noses 42 and the sides 1 is relieved from all weight or strain, the weight of the rear end of the vehicle being entirely supported by the rear axle 49 on the two noses 42.

The rounded ends 25 of the plates 21 prevent any injury to the front wheels either when running off from the upper ends of the tracks 13 or when returning thereto.

When it is desired to remove the automobile from the frame it is only necessary to bear with some force upon the then high rear end of the tiltable frame and at the same time to pull on the vehicle, whereupon the forces thus exerted are sufficient to move the tiltable frame to its first position and the pull on the vehicle is sufficient to start it on to and down the inclined tracks 13, whereupon the vehicle will gravitate from the tiltable frame.

Since some vehicles are differently balanced from others, a suitable adjustment of the intermediate bar 4 in one direction or the other lengthwise of the tiltable frame will compensate for such differences in balancing. Some vehicles may be somewhat wider than others, and this may be provided for with respect to the guides 19 by adjusting their forward ends one from the other more or less, this being permitted by the slotted flange 22.

When the vehicle leaves the structure the springs 38 return the parts previously displaced to their first position with the links 40 below the upper edges of the sides 1.

When the automobile is upon the tiltable frame and the latter has been tilted so that its forward end is low, the vehicle tires are entirely above the surface upon which the support is mounted and are wholly relieved from any weight. Moreover, the radiator is then low so that all water may be drawn therefrom, since the bottom of the radiator is then the lowest point of the cooling system.

What is claimed is:—

1. A lifting and supporting device for automobiles, comprising a tiltable frame, tracks exterior to the frame for elevating the entering end of an automobile moving on to the frame, means on the frame for engagement by the front axle of the automobile for actuation thereby in the direction of travel of the automobile on to the frame, supporting means on the frame for the rear axle of the automobile comprising rockable members carried by the frame at the entering end thereof and within the confines of the frame, and having axle-engaging means directed toward the entering end of the frame, said rockable means having a rising movement from the entering end of the frame toward the other end thereof, and connections between the first-named means and the rockable means for actuation of the latter by the movement of the first-named means under the action of the traveling automobile engaging them, and said tiltable frame being mounted to rock under the weight of the automobile to lower the forward end and raise the entering end, whereby an automobile entering the frame engages the first-named means by the front axle and thereby elevates the supporting means into position to engage the rear axle and lift the rear end of the automobile by the overbalancing of the frame of said automobile.

2. A lifting and supporting device for automobiles, comprising a tiltable frame, tracks exterior to the frame for elevating the entering end of an automobile moving on to the frame, means on the frame for engagement by the front axle of the automobile for actuation thereby in the direction of travel of the automobile on to the frame, supporting means on the frame for the rear axle of the automobile comprising rockable members carried by the frame at the entering end thereof and within the confines of the frame, and having axle-engaging means directed toward the entering end of the frame, said rockable means having a rising movement from the entering end of the frame toward the other end thereof, and connections between the first-named means and the rockable means for actuation of the latter by the movement of the first-named means under the action of the traveling automobile engaging them, and said tiltable frame being mounted to rock under the weight of the automobile to lower the forward end and raise the entering end, whereby an automobile entering the frame engages the first-named means by the front axle and thereby elevates the supporting means into position to engage the rear axle and lift the rear end of the automobile by the overbalancing of the frame of said automobile, said supporting means for the rear axle of the automobile having a nose projection directed toward the entering end of the frame to engage between the rear axle and the truss rod of the rear axle with the parts timed in action to cause the nose to be presented in position to engage under the rear axle of the automobile coincident with the tipping of the frame.

3. A device for elevating and supporting automobiles, comprising a tiltable frame and a support therefor upon which the tiltable frame is mounted, said support comprising inclined tracks on opposite sides of the support with cross bars connecting the tracks, one of the cross bars near the low ends of the tracks having sockets therein and the tiltable frame having pivot blocks fast thereto for seating in the sockets, and said tracks on the support having guides in spaced relation to the sides of the tiltable frame and provided with diverging wheel-engaging portions extending to the high ends of the tracks.

4. A lifting and supporting device for automobiles, comprising a tiltable frame of a width to be straddled by the wheels of the automobile, a supporting frame for the tiltable frame having inclined tracks for the wheels of the vehicle disposed on opposite sides of the tiltable frame, cross bars connecting the tracks with one of the cross bars located near the low end of the tracks and provided with sockets on its upper face, a cross bar on the tiltable frame intermediate of the ends thereof, pivot blocks carried by the intermediate bar and engaging in the sockets, and brackets connecting the intermediate bar to the sides of the tiltable frame and adjustable lengthwise of said tiltable frame for adapting the lifting and supporting device to different automobiles.

5. A lifting and supporting device for automobiles, comprising a tiltable frame of a width to be straddled by the wheels of the automobile, inclined tracks for the wheels of the vehicle disposed on opposite sides of the frame, and guides on the tracks for centering the vehicle with respect to the length of the frame, said guides being pivoted at the ends toward the entering end of the frame and having means for the adjustment of the other ends of the guides to vary the spread of the guides one from the other at the last-named ends.

6. An elevating and supporting device for automobiles, comprising a tiltable frame with a link and lever parallel-motion structure at each side of the frame near one end thereof, a lever for each parallel-motion structure arranged at the other end of the frame on the same side, and connections between the parallel-motion structure and the corresponding lever with the lever in the path of the front axle of an automobile straddling the frame, and the link and lever device having a nose projection directed toward the entering end of the structure and arranged to interpose between the rear axle of the vehicle and the truss rod of the rear axle.

In testimony that I claim the foregoing as my own, I have hereto affixed my signature in the presence of two witnesses.

HENRY C. KING.

Witnesses:
 F. J. FLETCHER,
 C. E. RUST.

Copies of this patent may be obtained for five cents each, by addressing the "Commissioner of Patents, Washington, D. C."